(No Model.) 2 Sheets—Sheet 1.
W. GRUNOW, Jr.
ELECTRIC RAILWAY.
No. 575,346. Patented Jan. 19, 1897.
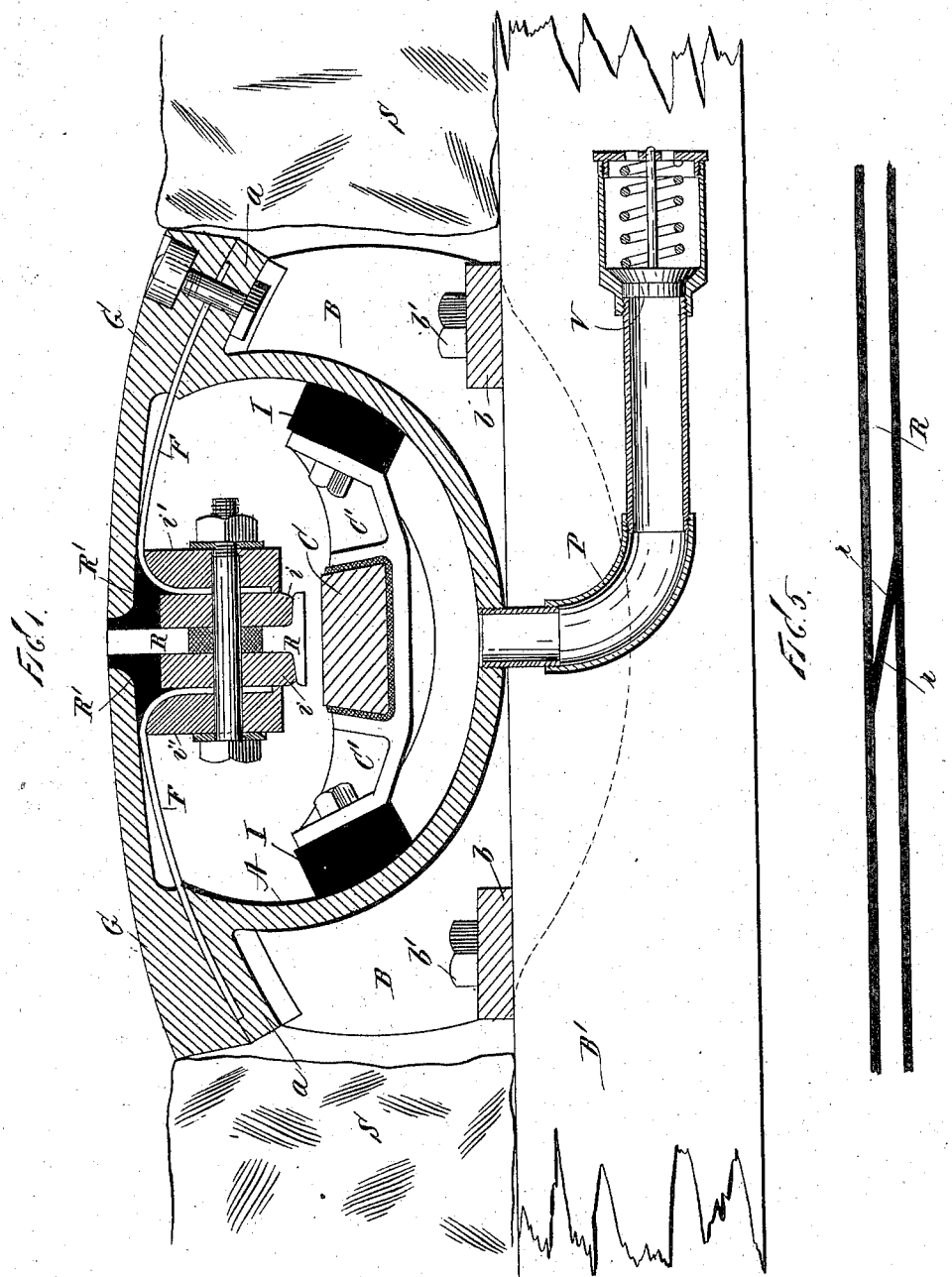
WITNESSES.
John Buckler,
C. Gerst.
INVENTOR
William Grunow Jr.,
BY
Edgar Tate & Co
ATTORNEYS.

(No Model.) 2 Sheets—Sheet 2.
W. GRUNOW, Jr.
ELECTRIC RAILWAY.
No. 575,346. Patented Jan. 19, 1897.
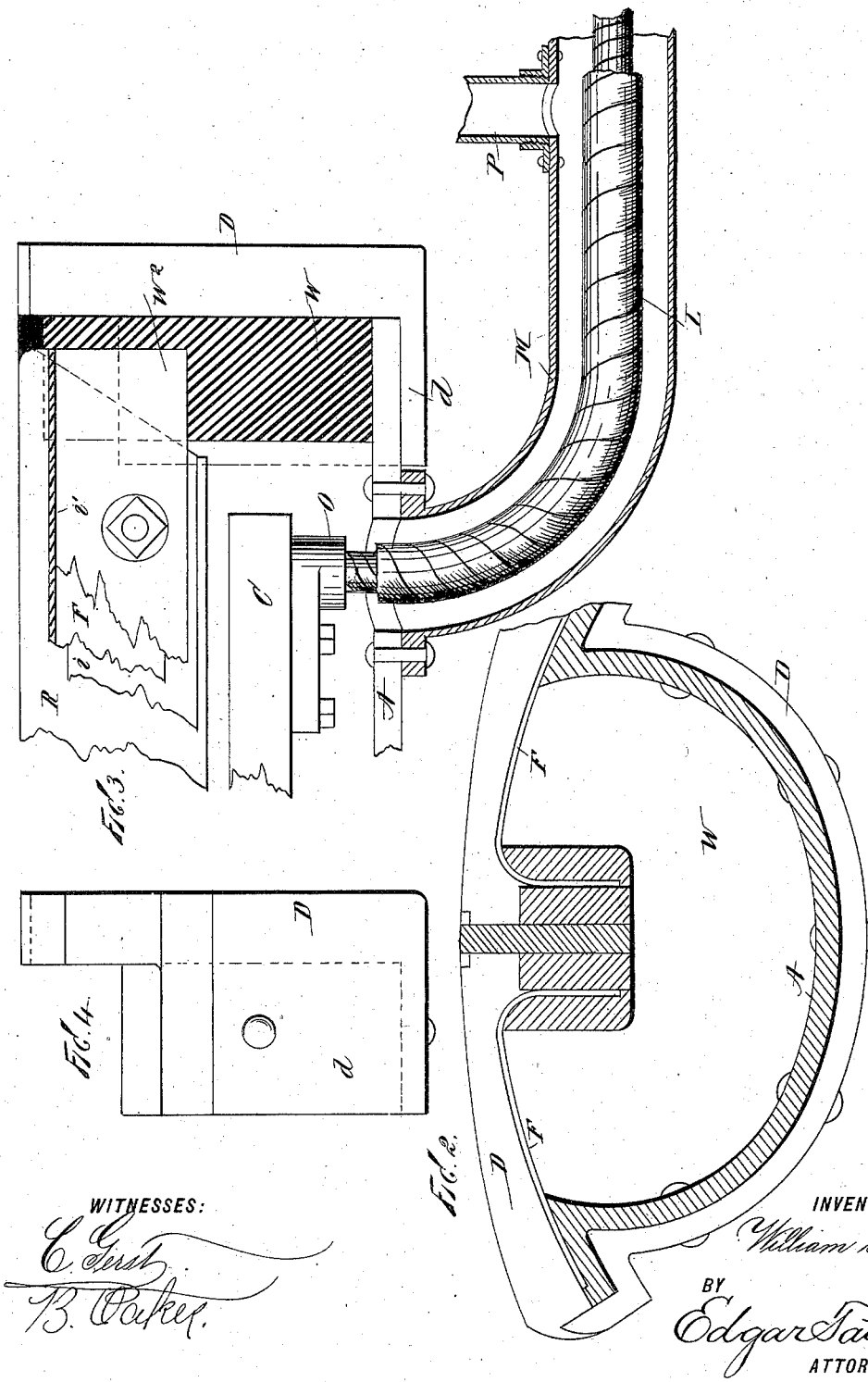
WITNESSES:
E. Gerst
B. Parker
INVENTOR
William Grunow Jr.
BY
Edgar Tate & Co.
ATTORNEYS

UNITED STATES PATENT OFFICE.

WILLIAM GRUNOW, JR., OF BRIDGEPORT, CONNECTICUT, ASSIGNOR OF ONE-HALF TO ZALMON GOODSELL, OF SAME PLACE.

ELECTRIC RAILWAY.

SPECIFICATION forming part of Letters Patent No. 575,346, dated January 19, 1897.

Application filed October 28, 1895. Serial No. 567,139. (No model.)

*To all whom it may concern:*

Be it known that I, WILLIAM GRUNOW, Jr., a citizen of the United States, and a resident of Bridgeport, in the county of Fairfield and State of Connecticut, have invented certain new and useful Improvements in Electric Railways, of which the following is a specification, reference being had to the accompanying drawings, forming a part thereof, in which similar letters of reference indicate corresponding parts.

The invention to which this application relates is an improvement on that described in an application for Letters Patent filed by me on the 27th day of August, 1895, Serial No. 560,662, and the invention relates to electric railways; and the object thereof is to provide an improved underground conduit for a conductor, in connection with which a depressible rail is employed, on which the trolley is adapted to bear, and which is adapted to be depressed so as to be brought into contact with the conductor and thus complete the circuit through the motor on a car.

The invention is fully disclosed in the following specification, of which the accompanying drawings form a part, in which—

Figure 1 is a transverse section of my improved conduit; Fig. 2, a similar view adjacent to one of the end caps with a portion of the parts omitted; Fig. 3, a longitudinal section of a coupling device which is employed where it is necessary to carry the conductor beneath crossings, switches, &c.; Fig. 4, a side view of an end plate which I employ in connection with the construction shown in Fig. 3, and Fig. 5 is a plan view of a section of the depressible rail.

In the practice of my invention I provide a conduit consisting of a trough A, which is preferably composed of wrought-iron rolled into the required shape, substantially as shown in Fig. 1, and which rests upon or is supported by seats or ribs B, which are bolted to the cross-tie, one of which is shown at B', by means of plates b, formed on said seats or ribs, and bolts b', which are passed therethrough. The conduit also comprises a flexible depressible top or cover consisting of a sectional contact-rail R and flexible side plates F, of tempered sheet-steel or other suitable metal, separated from one another by insulating-strips i i and i' i', which are firmly bolted together in the most thorough manner, so as to secure an air and water tight connection between them, and the flexible plates F rest upon the upper opposite flanges a of the trough A, and, as will be seen, the inner edges of these plates F are curved downwardly and passed between the strips i and i', as clearly shown in Fig. 1, and secured together by a bolt which passes therethrough.

Guard or surface plates G are bolted to the flanges of the trough A, and between these surface plates and said flanges the flexible plates F of the depressible cover are clamped, as shown in Fig. 1, every precaution and care being exercised to secure an air and water tight connection.

The inner edges of the surface plates are separated by a narrow slot and run parallel with one another, thus forming a slot of a suitable practical width for the depressible rail R, said slot being wider than said rail for the purposes hereinafter set out.

The depressible rail R is situated centrally of this slot and between the opposite edges of the surface plates G in such manner that the upper portion thereof is flush with the top of said plates. The space between the depressible sectional rail R and the surface plates G is filled with asphaltum or other suitable insulating material, as shown in heavy black lines at R', after the parts have been assembled and the laying of the conduit has been completed. This insulating material also affords a protection to the insulating-strips i and i' against moisture, snow, sleet, &c., and said insulating-strips are to be constructed with the best-known material, and for this purpose fiber or well-seasoned oak, saturated in boiling oil, heavily coated with asphalt varnish, may be employed. Below the depressible rail R and within a proper distance of the same is a conductor C, which extends throughout the length of the conduit and is firmly held by supports C', from which it is thoroughly insulated, and said supports being also insulated by blocks I of any desired insulating material, and the supports C' consist of transverse ribs firmly bolted to the trough A, the bolt being also passed through the insulating-blocks I.

The conductor C may be of any preferred material and is preferably of suitable size to carry the full electric current, thereby dispensing with feeder wires or cables, and, as will be readily understood, said conductor is entirely surrounded by air except at the point where it is insulated from the supports C', and in case moisture should accumulate within the conduit by condensation or otherwise the same may be expelled either by the use of moisture-absorbing chemicals placed at intervals within the conduit or by compressed air, which will drive the moisture out through the discharge-pipes P, which are provided with automatic valves V, which are situated at desirable intervals along the conduit, said valves being constructed in such manner as to prevent the entrance of moisture from without.

The depressible rail R is divided into sections, as shown in Fig. 5, and the ends of these sections are scarfed or inclined in such manner that they overlap, as shown at $r$, and said ends are separated by insulating material, and the sections are united in any desired manner, and a continuous depressible rail is thus obtained.

Only one or two sections at a time are in circuit, or "alive," when the rail is depressed into contact with the conductor C, and the ends of the sections are scarfed and overlap in order that the trolley-wheel may make contact with one section before leaving another, and the top surface plates G are preferably curved or inclined from the central slot, so that water and slush may more readily flow therefrom.

It is sometimes necessary to provide means for carrying a conductor beneath crossings, switches, &c., and I have shown a construction for accomplishing this object in Fig. 3. In this construction I provide an end plate D, (shown in Figs. 2, 3, and 4, said Fig. 4 being a side view thereof,) and said end plate is provided with projecting flanges, as shown at $d$, which are adapted to inclose the end of the trough A, to which it is securely bolted, and within the inner inclosure of the conduit formed by the sides of the trough A and the upper flexible depressible cover is driven a packing of molded vulcanized rubber or flexible fiber, as shown at W in Figs. 2 and 4, and the upper part of which may be recessed to form a pocket for the depressible rail and its surrounding insulating-strips, as shown at $W^2$ in Figs. 3 and 4. In this form of construction the ends of the conduit are united by means of a pipe M, which is also furnished with an outlet-pipe P and a valve V similar to that shown in Fig. 1, said valve being not shown in Fig. 3, and within the pipe M is an insulated cable L, which is properly connected with the conductor in each conduit, said connection being made, as shown at O, by means of a tubular head secured to the conductor, and, as will be observed, the pipe M is securely bolted to the bottom of the trough A, and said pipe is also air and water tight, or as nearly so as is possible.

The conduit may be laid in sections in order to allow for expansion and contraction, if necessary, and it may preferably be embedded in or surrounded by asphaltum, against which the street paving-blocks S may be placed, and the space between the flexible depressible cover and the surface plates may be filled in with some kind of thick grease or vaseline to prevent the entrance of water therein when the rail is depressed and also to prevent the formation of ice, and a thin layer or coating of vaseline may also be placed on the contact-surface of both the depressible rail and the conductor.

In constructing the conduit any preferred metals may be employed, and any best known materials for insulating may also be selected, and it will be observed that the construction permits of ready access to any or all parts of the conduit and to the conductor when necessary for the purpose of examination or repairs.

Neither rain, snow, nor ice will have any detrimental effect upon the operation of this conduit, and any substance that may remain on the surface plates may be scraped or rubbed off by scrapers or sweepers attached to the trolley or contact wheel, or to the bottom of the car or motor, and the top or contact edge of the depressible rail may be concave in cross-section to form a guide for the rolling-trolley, if desired, or it may be of any preferred form.

My invention is not limited to the exact form, construction, and arrangement of parts herein shown and described, and I therefore reserve the right to make all such alterations therein and modifications thereof as fairly come within the scope of the invention.

Having fully described my invention, I claim and desire to secure by Letters Patent—

1. An underground conduit for electric railways, comprising a metal trough, having a flexible cover or top, composed of flexible metal plates each of which is secured to the sides of the trough and to the depressible rail, said plates being curved inwardly at their adjacent edges, and securely bolted between strips of insulating material, between which is placed a depressible contact-rail on a level with the surface of the track, said conduit being also provided with a conductor situated in the bottom of the conduit and in proximity to said contact-rail, substantially as shown and described.

2. An underground conduit for electric railways comprising a metal trough having a flexible cover or top composed of flexible metal plates each of which is secured to the sides of the trough, and to the depressible rail, said plates being curved inwardly at their adjacent edges, and securely bolted between strips of insulating material, between which is placed a depressible contact-rail, said conduit being provided with a conductor situated in the bottom of the conduit, and in proximity to said contact-rail, said conduit being also provided with surface plates which are bolted to the sides of the trough over said flexible plates, and between which is a longitudinal slot into which the depressible contact-rail is adapted to project flush with said surface plates, substantially as shown and described.

3. An underground conduit for electric railways, comprising a metal trough having a flexible cover or top composed of flexible metal plates which are bolted to the sides of the trough, and to the contact-rail said plates being curved inwardly at their adjacent edges, and securely bolted between strips of insulating material, between which is placed a depressible contact-rail, said conduit being also provided with surface plates which are bolted to the sides of the trough over said flexible plates, and between which is a longitudinal slot into which the depressible contact-rail is adapted to project, the space at each side of said contact-rail and above the insulating-strips by which it is supported being filled in with asphaltum or similar material, substantially as shown and described.

4. A conduit for underground electrical conductors comprising a trough as A which is held in place by ribs as B, which are bolted to the cross-tie B', said trough being provided with a depressible cover composed of flexible strips each of which is bolted to the sides thereof and to the depressible rail, the adjacent edges of said strips being bent downwardly and passed between strips of insulating material, which are firmly held together and between the inner strip of which is placed a depressible contact-rail, adapted to contact therewith, and a conductor underneath said rail extending vertically therethrough and forming contact directly with the conductor and trolley-wheel, substantially as described.

5. A conduit for underground electrical conductors, comprising a trough as A which is held in place by ribs as B, which are bolted to the cross-ties B', said trough being provided with a depressible cover composed of flexible strips, each of which is bolted to the sides thereof, and to the depressible rail the adjacent edges of said strips being bent downwardly and passed between said strips of insulating material which are firmly bolted together and between the inner strips of which is placed a depressible contact-rail, said trough being also provided with surface plates above said depressible cover which are bolted thereto at the sides thereof, and between which is a slot into which said depressible rail projects and a conductor underneath said rail and adapted to contact therewith, substantially as shown and described.

6. The combination with an underground conduit for electrical railways composed of a metal trough, which is held in place by ribs which are attached to the cross-ties, of means for carrying the conductor beneath a crossing, consisting of a pipe M, which is bolted to the bottom of the conduit and communicates therewith, said pipe being provided with an insulating-cable which connects with the respective ends of the conductor by a tubular head within the conduit, the ends of said conduit being closed by a cap or plate having flanges formed thereon, which inclose the end of the conductor and a discharge-pipe provided with a spring-actuated valve, substantially as shown and described.

7. The combination with an underground conductor for electrical railways composed of a metal trough which is held in place by means of ribs which are attached to the cross-tie, of means for carrying the conductor beneath the crossing, consisting of a pipe as M, which is bolted to the bottom of the conduit and communicates therewith, said pipe being provided with an insulating-cable which connects with the respective ends of the conductor, within the conduit by means of a tubular head O and the ends of said conduit being closed by a cap or plate having flanges formed thereon, which inclose the end of the conductor, the ends of the conduit being also closed by means of a packing composed of rubber or similar material, and a chemical absorbing material, placed at intervals within the conduit, whereby the moisture or condensation accumulating within the conduit is absorbed, substantially as shown and described.

In testimony that I claim the foregoing as my invention I have signed my name, in presence of the subscribing witnesses, this 24th day of October, 1895.

WILLIAM GRUNOW, Jr.

Witnesses:
   H. F. NORCROSS,
   CHAS. KELSEY.